(No Model.)
W. S. ELLIOTT & C. A. BARNES.
HARROW ATTACHMENT FOR WHEEL CULTIVATORS.
No. 534,638. Patented Feb. 26, 1895.
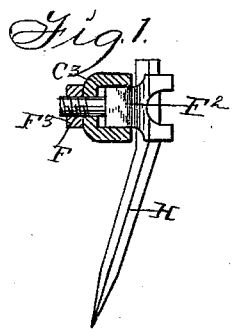
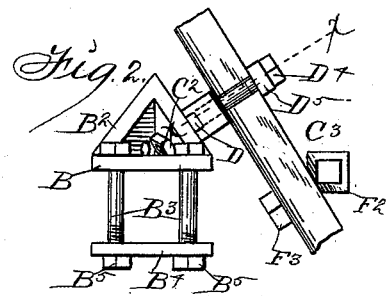
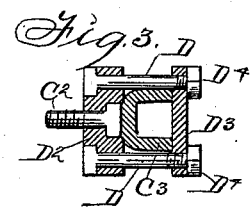
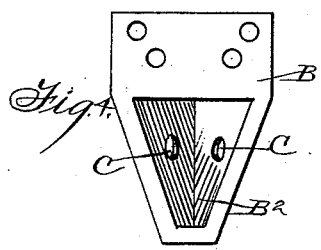
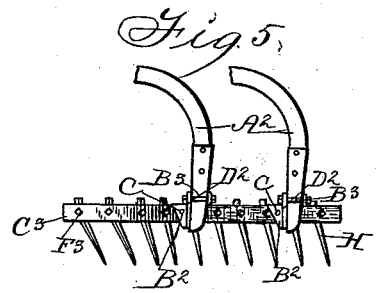
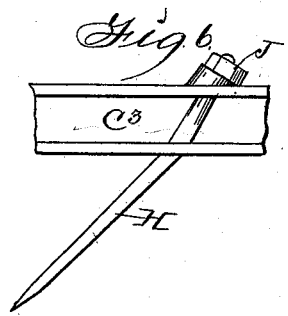
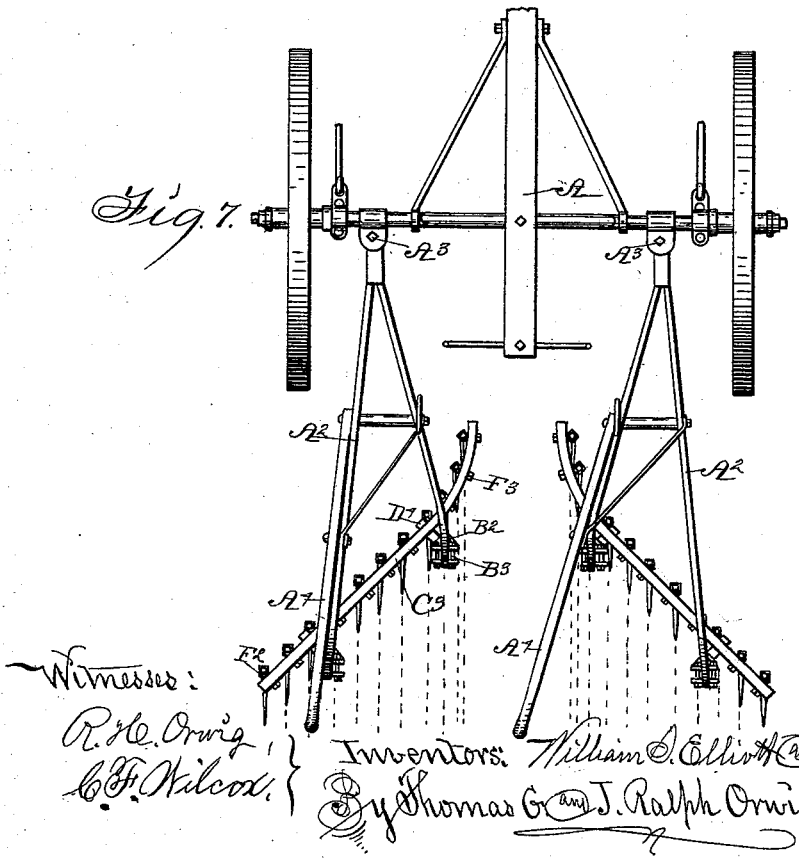

UNITED STATES PATENT OFFICE.

WILLIAM S. ELLIOTT AND CHARLES A. BARNES, OF WEST LIBERTY, IOWA.

HARROW ATTACHMENT FOR WHEEL-CULTIVATORS.

SPECIFICATION forming part of Letters Patent No. 534,638, dated February 26, 1895.

Application filed March 10, 1894. Serial No. 503,103. (No model.)

*To all whom it may concern:*

Be it known that we, WILLIAM S. ELLIOTT and CHARLES A. BARNES, citizens of the United States of America, residing at West Liberty, in the county of Muscatine and State of Iowa, have invented an Improved Harrow Attachment for Wheel-Cultivators, of which the following is a specification.

The object of this invention is, first, to provide a simple, strong and reversible device for detachably connecting a plurality of harrow teeth attached thereto, with a frame of a wheel cultivator; and our object is further to provide improved means for clamping the harrow teeth to the harrow frame and to so arrange said harrow frame that two or more of the harrow teeth will operate in close proximity to a row, and at the same time maintain a sufficient distance between the teeth.

With these objects in view, our invention consists, first, in the construction of a device for connecting a harrow with the frame of a wheel cultivator so as to produce a readily reversible and detachable connection therewith.

Our invention consists further in the construction of the bars for supporting the teeth, and also in the means for connecting the harrow teeth with said bars, as hereinafter fully set forth, pointed out in our claims and illustrated in the accompanying drawings, in which—

Figure 1 is a detail view of the device for clamping the teeth to the frame of the harrow. Fig. 2 is a detail view of a portion of the harrow frame and the device for connecting the same with the frame of the cultivator. Fig. 3 is a sectional view through the line X—X of Fig. 2. Fig. 4 is a detail view of the device for attaching the cultivator frame to the frame of the harrow. Fig. 5 is a side view of the downwardly projecting standards of the cultivator frame and a harrow section connected therewith. Fig. 6 is a detial view showing a modified manner of connecting the harrow teeth with the frame. Fig. 7 is a top or plan view of the complete wheel cultivator frame and harrows connected therewith as required in practical use.

Referring to the accompanying drawings, the reference letter A is used to designate the running gear of the wheel cultivator.

$A^2$ designates a frame for supporting a cultivator pivotally connected with the axle of the running gear at $A^3$ so as to be capable of being swung laterally at its rear end, a handle, $A^4$, being provided whereby the lateral movements of this frame may be controlled. A like frame is pivoted to each side of the said axle, and hereinafter but one will be specifically described.

The device for attaching the rear ends of the cultivator frame to the frame of the harrow consists of a piece of metal B, having an angular projection $B^2$ on its forward face so as to form two faces converging and disposed at an angle approximating forty-five degrees.

$B^3$ designates two bolts passed through suitable openings in the said piece of metal B and connected at their outer ends by a cross piece $B^4$ with nuts $B^5$ on their ends adapted to engage said cross piece and provide means whereby the lower ends of the standards of the cultivator frame may be detachably fixed thereto. Formed in the sides of the angular projection $B^2$ are the openings C, adapted to admit a bolt $C^2$ to be passed therethrough and through the frame of the harrow, and which frame is made of an angle iron $C^3$. By reason of the shape of the projection $B^2$ the frame $C^3$ is connected with the device C and held at an angle approximating forty-five degrees relative to the frame of the cultivator or the line of advance and as both sides of said projection are inclined at the same angle, it will readily be seen that the same coupling device may be used interchangeably on the right or left hand cultivator frame.

D—D indicate bolts projecting outwardly from a bar $D^2$ that is adapted to be bolted to the sides of the said projection $B^2$, and $D^3$ is a cross piece fitting over their outer ends and adapted to be adjusted thereon by the nuts $D^4$ whereby the frame $C^3$ may be readily clamped therein. It will now be obvious that the frame of the harrow may be readily, detachably and adjustably fixed to the frame of a cultivator and that the same coupling device may be used on either side and adapted to hold the bar $C^3$ at an angle of forty-five degrees, approximately, relative to the line of advance.

F indicates a bolt adapted to be passed through the angle iron, C³ and is provided at its outer end with a vertical, angular opening adapted to admit a harrow tooth, and its central portion F² is adapted to fit inside of the angle iron and be capable of sliding therein. A nut F³ on the outer end of said bolt provides means whereby it may be adjusted relative to the angle iron. In practical use, a harrow tooth H, preferably bent near its top portion, as clearly shown, is extended outwardly through the opening in the said bolt, and in order to securely fix the same therein, the nut F³ may be tightened until the bolt is drawn inwardly in the frame C³ sufficiently to bring the inner edge of the harrow tooth into engagement with the edges of the angle iron.

In the modified form shown in Fig. 6 the harrow teeth are extended through openings formed in the angle iron and connected therewith by a nut J at the top of the angle iron.

In order to pulverize the ground more thoroughly in close proximity to the row of plants which it is desired to cultivate, we curve the forward ends of the frame of the harrow inwardly to an approximately parallel position relative to the line of advance. It will thus be seen that the inner harrow teeth will engage the ground surface much closer together than will the harrow teeth on the straight portions of the harrow, and at the same time an equal distance is maintained between all of the harrow teeth.

We do not desire to be understood as limiting ourselves to curving the forward ends of the harrow frame C³ as it will be obvious that an angle may be formed therein to produce the same result, viz., the throwing of the harrow teeth closer together in proportion to their proximity to the row to be cultivated without placing the teeth nearer upon the harrow frame. It would be objectionable to place the teeth closer than shown upon the frame of the harrow so as to produce the same result as our improved device produces, for the reason that small objects such as stones, weeds, &c., could not pass between them and their operation be thereby impaired, but by thus bending the frame of the harrow two or more teeth may be made to dig a furrow in close proximity to each other and thereby thoroughly cultivate the ground close to the plants.

Having thus described our invention, what we claim as new therein, and desire to secure by Letters Patent of the United States therefor, is—

1. In combination with a wheel cultivator having two or more downwardly extending standards and one or more harrow-tooth carrying bars, adapted to be connected with said standards at an angle relative to the line of advance, of a device composed of a flat metal plate adapted to be placed in a vertical position, two bolts connected therewith and extended rearwardly, a plate on the bolts near their ends and nuts on said ends, whereby the plate may be adjustably clamped to standards of any size, and an angular projection formed on the forward surface of said plate with its sides parallel with the harrow-tooth carrying bars and having openings in each side adapted to admit bolts whereby the device may be clamped to a tooth carrying bar on either side, for the purposes stated.

2. The combination with a wheel cultivator frame having one or more downward projecting standards, of a device B, having the angular projection B² formed thereon and provided with the openings C—C as set forth, suitable bolts B³ passed through openings in the said device, a cross piece on said bolts and nuts on their ends for the purposes stated, a bar D² adapted to engage the surface of the angular projection B² and a bolt C² passed therethrough and adapted to be passed through one of the openings C a nut to secure said bolt on the inside of said angular projection and two bolts passed through the outer ends of the bar D² and having a cross piece slipped over their ends and nuts on their ends adapted to clamp a frame therein, substantially in the manner set forth and for the purposes stated.

3. In a cultivator, in combination with a cultivator frame or carriage, two mating tooth-bearing bars having their front end portions curved outward and in opposite directions relative to the center of the complete cultivator, to operate in the manner set forth, for the purposes stated.

WILLIAM S. ELLIOTT.
CHARLES A. BARNES.

Witnesses:
ELI ELLIOTT,
THOMAS R. CHASE.